(12) United States Patent
Paulig et al.

(10) Patent No.: US 9,416,770 B2
(45) Date of Patent: Aug. 16, 2016

(54) AERODYNAMIC WIND ENERGY CONVERSION DEVICE AND METHOD FOR CONTROLLING SUCH A DEVICE

(71) Applicant: SKYSAILS GMBH, Hamburg (DE)

(72) Inventors: Xaver Paulig, Hamburg (DE); Bernd Specht, Hanstedt-Weihe (DE)

(73) Assignee: SKYSAILS GMBH, Hamburg (DE)

( * ) Notice: Subject to any disclaimer, the term of this patent is extended or adjusted under 35 U.S.C. 154(b) by 0 days.

(21) Appl. No.: 14/397,817

(22) PCT Filed: May 3, 2013

(86) PCT No.: PCT/EP2013/059234
§ 371 (c)(1),
(2) Date: Oct. 29, 2014

(87) PCT Pub. No.: WO2013/164443
PCT Pub. Date: Nov. 7, 2013

(65) Prior Publication Data
US 2015/0125294 A1   May 7, 2015

Related U.S. Application Data

(60) Provisional application No. 61/642,112, filed on May 3, 2012.

(51) Int. Cl.
*F03D 7/02* (2006.01)
*B63H 9/06* (2006.01)

(52) U.S. Cl.
CPC .............. *F03D 7/02* (2013.01); *B63H 9/0685* (2013.01); *B63H 2009/0692* (2013.01); *F05B 2240/232* (2013.01)

(58) Field of Classification Search
CPC ............ B63B 27/08; B63H 9/04; B63H 9/06; B63H 9/068; B63H 9/0685; F03D 7/02

USPC ................... 114/102.12, 102.16, 102.18, 273
See application file for complete search history.

(56) References Cited

U.S. PATENT DOCUMENTS 7,866,271 B2 *  1/2011  Wrage ................. B63H 9/0685
                                                   114/102.1
8,117,977 B2 *  2/2012  Reusch ................ B63H 9/0685
                                                   114/102.1

(Continued)

FOREIGN PATENT DOCUMENTS

GB          2098947 A      12/1982
WO       2005/100150 A1    10/2005

OTHER PUBLICATIONS

International Preliminary Report on Patentability mailed Nov. 13, 2014, from PCT Application No. PCT/EP2013/059234 (6 pages).

(Continued)

*Primary Examiner* — Lars A Olson
(74) *Attorney, Agent, or Firm* — Kilpatrick Townsend & Stockton LLP

(57) ABSTRACT

The invention relates to an aerodynamic wind energy conversion device and a method for controlling such a device. The aerodynamic wind energy conversion device comprises an aerodynamic wing; at least a first tractive line and a second tractive line; wherein ends of the tractive lines are connected to line connection points located at the aerodynamic wing; at least a first and a second reefing point located across the aerodynamic wing and is characterized in that the length of the second tractive line is shorter than the length of the first tractive line; and wherein the first reefing point is spaced from the first line connection point in a first reefing distance and the second reefing point is d spaced from the second line connection point in a second reefing distance, such that the second reefing distance is longer than the first reefing distance.

21 Claims, 2 Drawing Sheets

(56) References Cited

U.S. PATENT DOCUMENTS

Figure 1:
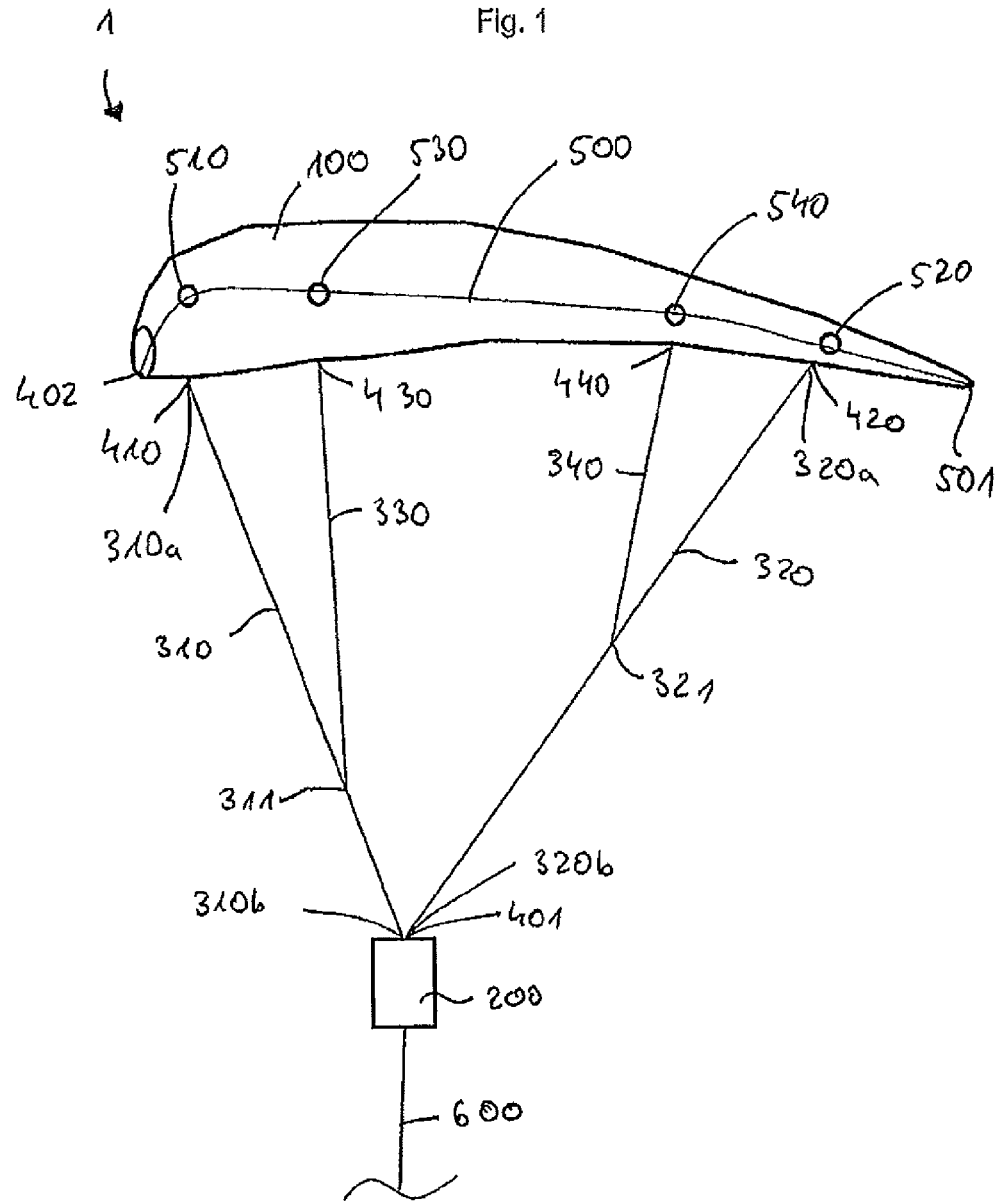

| | | | |
|---|---|---|---|
| 2007/0157868 A1* | 7/2007 | Wrage | B63H 9/0685 114/365 |
| 2007/0250226 A1* | 10/2007 | Wrage | B63H 9/0685 114/102.1 |
| 2007/0272141 A1* | 11/2007 | Wrage | B63H 9/0685 114/111 |
| 2008/0115716 A1* | 5/2008 | Wrage | B63H 9/06 114/343 |
| 2010/0192825 A1* | 8/2010 | Wrage | B63H 9/0685 114/102.16 |

OTHER PUBLICATIONS

International Search Report and Written Opinion mailed Jul. 24, 2013, from PCT Application No. PCT/EP2013/059234 (9 pages).

* cited by examiner

AERODYNAMIC WIND ENERGY CONVERSION DEVICE AND METHOD FOR CONTROLLING SUCH A DEVICE

This application is a U.S. National Phase of International Application No. PCT/EP2013/059234, filed May 3, 2013, which claims priority to U.S. Provisional Patent Application No. 61/642,112, filed May 3, 2012, the disclosures of which are incorporated by reference herein.

The invention relates to an aerodynamic wind energy conversion device, particularly for transferring wind energy to a watercraft, comprising an aerodynamic wing with an aerodynamic profile; a steering unit located below the aerodynamic wing; at least a first tractive line and a second tractive line; wherein the first end of each of the two tractive lines is connected to the steering unit, and the second end of the first tractive line is connected to a first line connection point located at the aerodynamic wing, and the second end of the second tractive line is connected to a second line connection point located at the aerodynamic wing; a tractive cable, a first end of the tractive cable being connected to the steering unit and a second end of the tractive cable being connected to a base platform; at least a first and a second reefing point located across the aerodynamic wing such that the shape of the aerodynamic wing can be controlled via at least one reefing line guided through the first and/or second reefing point.

The invention further relates to a method for controlling an aerodynamic wind energy conversion device, particularly for watercraft.

The invention further relates to a watercraft comprising an aerodynamic wind energy conversion device as well as to the use of an aerodynamic wind energy conversion device to transfer wind energy to a watercraft.

According to this description, an aerodynamic wind energy conversion device is to be understood as a device which might be used to provide kinetic energy for a movable platform or vessel such as a ship or the like in particular by applying a tractive force exerted by the aerodynamic wing onto the watercraft. Further, an aerodynamic wind energy conversion device is to be understood as a device which is driven by the wind and is movable with reference to a fixed base platform like a platform attached to the ground or fixed in the sea like e.g. for onshore or offshore wind energy plants and produces electrical or potential energy.

A major problem associated with such aerodynamic wind energy conversion devices as described beforehand is the control of the aerodynamic wing in use. In order to produce significant uplift forces with the aerodynamic wing which can be transferred via the tractive lines and the tractive cable to the movable or fixed base platform it is desirable to increase the size of the aerodynamic wing. However, the control of such large scale aerodynamic wings having sizes of 160 square meters and more, e.g. over 500 square meters, difficulties occur particularly during the starting and/or landing operations when the wing is in proximity of the base platform and its surroundings.

Aerodynamic wind energy conversion devices, methods for their controlling and elements of such aerodynamic wind energy conversion devices are known for example from the following applications: WO 2005/100147 A1 discloses a positioning device for controlling a wing element which is connected via a tractive cable to a ship to serve as main or auxiliary drive. Such energy conversion systems based on wing elements flying at high altitude and pulling the ship via a tractive force require large-scale wing elements and the control of such wing elements is a challenging task. In WO 2005/100147 A1 it is proposed to veer out or haul in the tractive cable in response to the flight condition of the wing element. To improve control of such wing elements in difficult wind conditions it is known from WO 2005/100148 A1 to couple a steering unit close below the wing element via a number of control lines and to connect the wing element to the nautical vessel via such a steering unit by a tractive cable extending between the nautical vessel and the steering unit. WO 2005/100149 A1 proposes various sensors to improve control of a wing element towing a nautical vessel. To improve steerability during starting and landing manoeuvres, WO 2005/100150 proposes a telescopic mast erected on the foredeck of a nautical vessel close to the fixing point of the tractive cable coupling the wing element to the nautical vessel. Using such mast, the wing element can be directly coupled to the top of the mast. Further improvements of aerodynamic wind energy conversion devices, methods for their controlling and elements of such aerodynamic wind energy conversion devices are known for example from the following applications: WO 01/92102 A1, WO 2006/027194 A1, WO 2006/027195 A1, WO 2007/112993 A1, WO 20087019700 A1, WO 2008031446 A2, WO 2009/026939 A1, WO 2009/071105 A1, WO 2009/080098 A1, WO 2009/143901 A1 and WO 2010/020263 A2.

These set ups and techniques of aerodynamic wings and their control will significantly improve the steerability and manoeuvrability as well as options to control the flight path of such aerodynamic wings according to the described applications. Thus, the control of the aerodynamic wind energy conversion device and its various elements, particularly during starting and/or landing maneuvers, has been the object of continuous improvement. However, it is desirable to provide additional improvements to facilitate the control of aerodynamic wings, in particular in challenging control situations like starting and/or landing maneuvers, and further continuous improvements to increase the safety and/or controllability and/or facilitation of starting and/or landing maneuvers are sought.

It is therefore an object of the present invention to provide for an aerodynamic wind energy conversion device and a method for controlling such a device that increases the safety and/or controllability in the handling and/or operation of an aerodynamic wind energy conversion device, particularly during starting and/or landing maneuvers of the aerodynamic wind energy conversion device, particularly of an aerodynamic wing.

These and other objects of the invention are achieved by providing an aerodynamic wind energy conversion device as described beforehand that is characterized in that the first tractive line has a length extending from a common base reference point, preferably the first end of the first tractive line or the base reference point, to the second end of the first tractive line at the first line connection point located at the aerodynamic wing, and the second tractive line has a length extending from the common base reference point, preferably the first end of the second tractive line or the base reference point, to the second end of the second tractive line at the second line connection point located at the aerodynamic wing; wherein the length of the second tractive line is shorter than the length of the first tractive line; and wherein the first reefing point is related to the first line connection point and spaced from the first line connection point in a first reefing distance and the second reefing point is related to the second line connection point and spaced from the second line connection point in a second reefing distance, such that the second reefing distance is longer than the first reefing distance.

The aerodynamic wind energy conversion device according to the invention consists of several entities that are coupled or connected to each other. The term connected is used in this context to have the meaning that the two entities being connected are directly or indirectly secured, fastened or attached to each other. An indirect connection may further comprise a connecting element or connecting member that physically establishes the connection between the entities. The term coupled is used in the present context to describe a functional relationship or engagement, respectively, between the coupled elements such that an element coupled to another element has an effect on the other element, e.g. a gear to a toothed belt or a pulley to a belt.

The aerodynamic wing is formed in an aerodynamic profile to thus generate the uplift force and may be formed as a hollow body and may comprise one or more openings in order to allow an air stream to enter and/or leave the interior of the aerodynamic wing and inflate and/or deflate the aerodynamic profile, respectively. The aerodynamic wing has sizes of more than 100 square meters, typically 160 square meters and more, e.g. over 500 square meters.

The tractive lines of the aerodynamic wind energy conversion device primarily accommodate forces resulting from the lift generated by the aerodynamic profile of the aerodynamic wing. These tractive forces are transferred to the tractive cable at least partially, in particular completely via the steering unit, thus connecting the base platform to the aerodynamic wing via the tractive lines, the steering unit and the tractive cable. The invention is described with reference to tractive lines. However, the inventive concept applies to any kind of lines extending from a base reference point to the aerodynamic wing, e.g. steering lines or guiding lines. In this description, the term tractive lines shall also comprise other lines extending from a base reference point to the aerodynamic wing that are susceptible to the advantages of the invention.

During starting and/or landing maneuvers the aerodynamic wing is transferred from a position in proximity to a base platform or a mast to a flying position high above the base platform and vice versa. The flying or operational altitude of an aerodynamic wing is preferably between 100 and 300 meters above sea-level, but may exceed 300 meters and reach up to 1000 meters.

The invention is based on the finding that the safety and/or controllability of the aerodynamic wind energy conversion device, particularly the aerodynamic wing and particularly during starting and/or landing maneuvers, can be improved by managing the lengths and positions of the tractive lines connecting the aerodynamic wing to the steering unit. The invention is particularly based on the finding that advantages can be achieved by reducing the slack of one, two or more tractive lines, particularly during starting and/or landing maneuvers.

During starting and/or landing maneuvers the aerodynamic wing is changed in its shape, size and/or volume, in particularly reduced, in its effective size compared to the maximum effective size during the flight operation of the aerodynamic wing. This state of reduced shape of the aerodynamic wing during starting and/or landing maneuvers can also be described as recovery state or recovering process. For this recovery for the aerodynamic wing, one or more reefing lines are pulled and these reefing lines are guided via at least a first and a second, preferably several reefing points that are located at different locations across the aerodynamic wing such that pulling the reefing lines leads to a changed, preferably reduced, shape of the aerodynamic wing. This action changes, preferably reduces, the dimension of the aerodynamic wing and thus also reduces the lift generated by the aerodynamic wing so that the tractive forces within the tractive lines and/or the tractive cable are reduced and the handling of the aerodynamic wing is facilitated. Preferably, the shape of the aerodynamic wing is reduced by pulling the at least one reefing line such that the reefing points located across the aerodynamic wing are brought into closer proximity to a top reference point. Such a top reference point can be for example a mast adapter or a kite stick located at the aerodynamic wing.

Typically, the tractive lines connecting the steering unit to the aerodynamic wing have different lengths in order to provide steerability and controllability of the aerodynamic wing during flight operation and to insure the aerodynamic wing can adapt its preferred aerodynamic profile. Further, usually a plurality of tractive lines, preferably branched out into a line tree, extend between the steering unit and the aerodynamic wing. While the tractive lines, their arrangement, locations and lengths are implemented in a way to ensure the preferred aerodynamic profile of the aerodynamic wing during flight operation, the situation is different during starting and/or landing maneuvers. During these maneuvers the aerodynamic wing is at least partially in a recovery state, i.e. the one or more reefing lines have been pulled in order to reduce the shape and/or the dimension of the aerodynamic wing. In these situations, the tractive lines usually have a different slack due to their differing lengths. Shorter tractive lines may still be under tension while longer tractive lines may have a considerable slack. The invention is based on the finding that particularly these slack lines lead to to considerable disadvantages. The slack lines may entangle other tractive lines, or snag on other elements of the aerodynamic wind energy conversion system or other items in the surroundings of the aerodynamic wind energy conversion system. Further, the slack lines may swing or whip and thus may damage surrounding elements or endanger persons in the proximity. Still further, the slack lines themselves could become damaged.

To avoid or reduce these disadvantages and increase the safety and/or the controllability of the aerodynamic wind energy conversion system, particularly the aerodynamic wing and particularly during starting and/or landing maneuvers, the invention provides the solution to place the reefing points related to longer tractive lines closer to the line connection points of these longer lines than the reefing points related to shorter tractive lines. The rationale behind this invention is that by pulling in the at least one reefing line, the reefing points are brought into closer proximity of a top reference point, for example the mast adapter or the kite stick, usually a center point of the aerodynamic wing, to which the reefing lines are guided in order to reduce the shape of the aerodynamic wing.

Reefing points can be blocks, ears or eyes or other guiding elements located across the aerodynamic wing through which a reefing line is guided. The at least one reefing line is preferably attached to the aerodynamic wing with at least one end. During the reefing process, the reefing points are brought into closer proximity to the top reference point. Each of the reefing points is related to or associated with a line connection point, i.e. a movement of a reefing point leads to a respective movement of the related line connection point, since the movement of the reefing point is transferred to the line connection point via a part of the aerodynamic wing extending between the reefing point and the line connection point. Preferably, the part of the aerodynamic wing between the reefing point and the line connection point can be a rib, a line or a reinforced part, i.e. with stronger material characteristics or a different geometry than other parts of the aerodynamic wing.

Since the reefing of the aerodynamic wing is controlled by a reefing line guided through the reefing points, the slack of the tractive lines is determined by the sum of the respective length of a tractive line plus the reefing distance between the connection point of the respective tractive line and the related reefing point. Therefore, by arranging the reefing points across the aerodynamic wing in the inventive pattern that different lengths of tractive lines are compensated by different reefing distances, the slack of the longer tractive lines can be reduced or even avoided.

In a preferred embodiment, the aerodynamic wind energy conversion device is characterized in that the sum of the length of the first tractive line and the length of the first reefing distance is approximately equal to the sum of the length of the second tractive line and the length of the second reefing distance, wherein preferably the sum of the length of the first tractive line and the length of the first reefing distance differs less than 30 percent, particularly less than 20 percent and further preferably less than 10 percent, from the sum of the length of the second tractive line and the length of the second reefing distance. In particular, it is preferred that said difference is less than 5% or less than 1% wherein said percentages are referred to the length of the first reefing line.

In this embodiment, the reefing points are located in relation to their respective associated line connection points such that the sums of the length of a respective tractive line and the respective reefing distance are the same or almost the same, i.e. that the sums of the lengths of the tractive lines and the respective reefing distances do not differ more than 30 percent of each other; preferably the sums differ 25 percent, 20 percent, 15 percent, 10 percent, 5 percent or less from each other. By limiting the differences in these sums, the maximum slack of tractive lines during starting and/or landing maneuvers, particularly in a recovery state of the aerodynamic wing, is reduced to a level that reduces the risk of entanglements and/or damages by/to slack lines significantly.

In a further preferred embodiment, the aerodynamic wind energy conversion device is characterized in that the first reefing point is spaced from a top reference point, preferably a mast adapter located on the aerodynamic wing, in a first flight reference distance and the second reefing point is spaced from the top reference point in a second flight reference distance; wherein the at least one reefing line and the reefing points are arranged and adapted such that by pulling the at least one reefing line the first and/or second flight reference distances can be reduced to first and/or second recovery reference distances in order to reduce the shape of the aerodynamic wing such that the aerodynamic wing can be recovered.

Due to the different shapes and dimensions of the aerodynamic wing during a flight operation in which the aerodynamic wing has a preferred aerodynamic profile to generate lift in a direction of the tractive cable when the air flow direction is approximately perpendicular to the tractive cable and a recovery state, in which the shape and/or dimension of the aerodynamic wing is reduced such that the lift generated by the aerodynamic wing is reduced, the arrangement of the reefing points located across the aerodynamic wing in relation to each other and in relation to top reference point is different in these two states of the aerodynamic wing. During flight operation, with the aerodynamic wing in a shape and/or dimension creating a preferred lift force, each reefing point has a distance from a top reference point in a flight reference distance. This flight reference distance can be different for different reefing points. During starting and/or landing maneuvers, particularly in a recovery state of the aerodynamic wing, the reference points are pulled in via the at least one reefing line such that the reefing points come into closer proximity to the top reference point and are located from this reference point in respective recovery reference distances. The recovery reference distance of a certain reefing point is preferably smaller than the flight reference distance of the same reefing point. It is particularly preferred that the reefing points are pulled in closely to the top reference point in the recovery state of the aerodynamic wing such that the recovery reference distances of the reefing points are preferably similar and further preferably smaller compared to the respective flight reference distances.

In a further preferred embodiment, the aerodynamic wind energy conversion device is characterized in that the sum of the length of the first tractive line, the length of the first reefing distance and the length of the first recovery reference distance is approximately equal to the sum of the length of the second tractive line, the length of the second reefing distance and the length of the second recovery reference distance, wherein preferably the sum of the length of the first tractive line, the length of the first reefing distance and the length of the first recovery reference distance differs less than 30 percent, particularly less than 20 percent and further preferably less than 10 percent, from the sum of the length of the second tractive line, the length of the second reefing distance and the length of the second recovery reference distance.

The present embodiment is particularly preferred in case a desired compensation of different lengths of the tractive lines is not or cannot be fully realized by adjusting the respective reefing distances, for example because a very large reefing distance may not be possible to implement due to the size of the aerodynamic wing or a specific location of a reefing point required for a large reefing distance is not desirable. In these cases, the reefing point may be located closer to the line connection point than required to compensate for different lengths of the tractive line. Particularly in the case of a very short tractive line a very long reefing distance would be necessary in order to reduce the slack of other, longer tractive lines. Therefore, if the reefing distance of a very short tractive line is smaller than desired, this can be further compensated by providing for a longer recovery reference distance for this specific reefing point and the specific tractive line, such that the sum of the specific recovery reference distance, the reefing distance and the length of a tractive line is equal to or at least does not differ more than 30 percent from the sum of another recovery reference distance, reefing distance and length of tractive line.

It is particularly preferred to design the tractive line tree, the location of the line connection points, the location of the reefing points and the reefing mechanism defining the recovery reference distances of the reefing points in the recovery state of the aerodynamic wing in a way such that excessive slack of singular or multiple tractive lines in the recovery state of the aerodynamic wing during starting and/or landing maneuvers is avoided.

In a further preferred embodiment the aerodynamic wind energy conversion device is characterized by a plurality of tractive lines corresponding to the first and second tractive lines and a plurality of reefing points corresponding to the first and second reefing points, wherein the reefing distances of reefing points related to line connection points of shorter tractive lines are longer than the reefing distances of reefing points related to line connection points of longer tractive lines, preferably such that the respective sums of the length of a tractive line and the respective reefing distance differ from each other less than 30 percent, particularly less than 20 percent and further preferably less than 10 percent.

As pointed out above, an aerodynamic wing is typically connected to the steering unit via a plurality of tractive lines that branch of fan out into a line tree. As mentioned above, the plurality of tractive lines may also comprise other lines, such as steering or guiding lines.

It is therefore preferred, if not only a first and a second tractive line with different lengths and the respective properties and related characteristics as described beforehand are present, but two or more, preferably a plurality or all of the tractive lines present in a line tree, are arranged and adapted such that the advantages of the invention are realized for this plurality of tractive lines and the respective plurality of reefing points as well as the respective sums of the tractive lines lengths, reefing distances as well as recovery reference distances that also apply not only to first and second reefing point but also accordingly to a plurality of reefing points.

A further preferred embodiment of the invention is characterized in that one reefing point is related to two or more line connection points such that the respective two or more line connection points are spaced from said one reefing point in two or more reefing distances.

In a particularly preferred embodiment the patterns of the reefing points and the line connection points are designed such that a single reefing point can be associated with or related to more than one line connection point. In this case the design has to be adapted such that the two or more reefing distances between this one single reefing point and the two or more connections points related to this reefing point are the respective reefing distances desired with respect to the respective tractive lines, particularly their lengths, connected to the respective line connection points associated with this one single reefing point. This embodiment is particularly preferred in order to reduce the number of required reefing points and reefing lines throughout the aerodynamic wing.

A further preferred embodiment is characterized by a mast adapter located on the aerodynamic wing, wherein the mast adapter is arranged and adapted to serve as at least on mast adapter reefing point, wherein preferably the flight reference distance and the recovery reference distance of the mast adapter reefing point are approximately equal and further preferably approximately equal to zero. This embodiment is particularly preferred in aerodynamic wind energy conversion devices wherein the aerodynamic wing comprises a mast adapter or kite stick. This mast adapter or kite stick can be used as a reefing point, a so called mast adapter reefing point.

It is further preferred that a mast adapter or kite stick located on the aerodynamic wing serves as the top reference point. In case both preferred embodiments are combined, the top reference point and the mast adapter reefing point can be identical or at least both located on the mast adapter or kite stick and thus located in close proximity such that the recovery reference distance of this mast adapter reefing point can be zero or close to zero depending on if the mast adapter reefing point and the top reference point are identical or respectively close to each other. If the mast adapter reefing point is fixedly positioned on the mast adapter or the kite stick, the flight reference distance and the recovery reference distance of the mast adapter reefing point are equal since this mast adapter reefing point would not be moved by pulling in the reefing line as is the case with the other reefing points located across the aerodynamic wing.

A further preferred embodiment of the aerodynamic wind energy conversion device according to the invention is characterized by a first tractive line extension having a length extending from a branch point between the first and the second end of the first tractive line to an extension line connection point located at the aerodynamic wing.

This embodiment is particularly preferred in aerodynamic wind energy conversion devices with the aerodynamic wing being connected to the steering unit via a plurality of tractive lines that fan out or branch out into a line tree. Such a line tree preferably comprises tractive line extensions that do not extend all the way from a line connection point located at the aerodynamic wing to the base reference point or the steering unit, but extend only from a line connection point located at the aerodynamic wing to a branch point on another tractive line that extends all the way from the line connection point at the aerodynamic wing to the base reference point or the steering unit. The point where the tractive line extension branches out from the tractive line towards the aerodynamic wing is called branch point and this branch point is located between the two ends of a tractive line extending between the aerodynamic wing and the base reference point.

In a further preferred embodiment the aerodynamic wind energy conversion device is characterized in that the sum of the first tractive line extension and a partial length of the first tractive line between the first end of the reference line or the base reference point and the branch point is approximately equal to the sum of the length of the first tractive line and the length of the first reefing distance; wherein preferably the sums differ less than 30 percent, particularly less than 20 percent and further preferably less than 10 percent.

It is further preferred that the sum of the first tractive line extension, a partial length of the first tractive line between the first end of the first tractive line or the base reference point and the branch point, and a recovery reference distance between the extension line connection point and a reefing point related to the extension line connection point is approximately equal to the sum of the length of the first tractive line, the length of the first reefing distance and the length of the first recovery reference distance; wherein preferably the sums differ less than 30 percent, particularly less than 20 percent and further preferably less than 10 percent.

Still further it is preferred that an aerodynamic wind energy conversion device comprises a plurality of tractive line extensions corresponding to the first tractive line extension and a plurality of reefing points related to respective extension line connection points, wherein the reefing distances of reefing points are shorter when related to extension line connection points with a larger sum of the length of the respective tractive line extension and the partial length of the respective tractive line between the first end of the respective tractive line or the base reference point and the branch point.

These embodiments detail for aerodynamic wind energy conversion devices with an aerodynamic wing connected to the steering unit via a line tree that the properties, characteristics, arrangements and advantages described with respect to tractive lines extending from the aerodynamic wing to the base reference point or steering unit accordingly apply to tractive line extensions that extend from the aerodynamic wing not all the way to the base reference point or the steering unit but join a tractive line at a branch point between the aerodynamic wing and the base reference point. These embodiments are particularly preferred for long tractive line extensions with branch points closer to the base reference point than to the aerodynamic wing, since particularly those long tractive line extensions are associated with the same or similar risks and disadvantages as tractive lines extending from the aerodynamic wing to the base reference point. However, particularly very short line extensions extending from the aerodynamic wing to a branch point close to the aerodynamic wing may not be related to the same extent with the risks and disadvantages resulting from slack so that those shorter tractive line extensions may not be adapted according to these embodiments since a slack of these shorter line extensions might be accepted in trade of for a less complex reefing point arrangement.

According to a further preferred embodiment the aerodynamic wind energy conversion device is characterized by a further reefing point related to at least one line connection point, wherein the further reefing point is located at one of the tractive lines or tractive line extensions. In this embodiment not all reefing points are located at the aerodynamic wing but a further reefing point is located on or at a tractive line or a tractive line extension. In this case, the reefing distance can be seen to have a negative value, i.e. the sum of the length of the tractive line and the respective reefing distance would actually be a value smaller than the length of the tractive line. This embodiment can be particularly preferred for particularly long tractive lines or long tractive line extensions and particularly in aerodynamic energy conversion devices with a line tree that comprises tractive lines and/or tractive lines extensions of rather different lengths. The larger the differences in the different lengths of the tractive lines or the tractive lines extensions, the larger the differences in reefing distances and eventually recovery reference distances have to be in order to compensate for the different lengths of the tractive lines or the tractive line extensions. By placing a reefing point on a long tractive line, the differences in the lengths of the tractive lines or the tractive line extensions is virtually or conceptually reduced such that also the differences of the lengths of reefing distances and recovery reference distances can be reduced. This is particularly advantageous since the space available for realizing large reefing distances or recovery reference distances on an aerodynamic wing is usually limited.

According to a further aspect of the invention the objective mentioned above and other objectives are solved by a watercraft comprising an aerodynamic wind energy conversion device according to the invention or any of the described embodiments.

According to a further aspect of the invention the objective mentioned above and other objectives are solved by the use of an aerodynamic wind energy conversion device according to the invention or any of the previous described embodiments to drive a watercraft.

According to a further aspect of the invention the objective mentioned above and other objectives are solved by a method for controlling an aerodynamic wind energy conversion device, particularly for watercraft, comprising the steps: Providing an aerodynamic wind energy conversion device, comprising an aerodynamic wing with an aerodynamic profile; a steering unit located below the aerodynamic wing; at least a first tractive line and a second tractive line; wherein the first end of each of the two tractive lines is connected to the steering unit, and the second end of the first tractive line is connected to a first line connection point located at the aerodynamic wing, and the second end of the second tractive line is connected to a second line connection point located at the aerodynamic wing; a tractive cable, a first end of the tractive cable being connected to the steering unit and a second end of the tractive cable being connected to a base platform; at least a first and a second reefing point located across the aerodynamic wing such that the shape of the aerodynamic wing can be controlled via at least one reefing line guided through the first and/or second reefing point; reefing the aerodynamic wing by pulling the at least on reefing line such that that the particularly an aerodynamic wind energy conversion device according to the invention of any of the embodiments described before; Providing an aerodynamic wind energy conversion device according to the invention of any of the embodiments described before; reefing the aerodynamic wing by pulling the at least on reefing line such that that the second reefing distance is longer than the first reefing distance.

As to the advantages, preferred embodiments in details of these further aspects and their respective preferred embodiments, reference is made to the corresponding aspects and embodiments of the aerodynamic wind energy conversion device described above.

A preferred embodiment of the invention shall now be described with reference to the attached drawings, in which FIG. 1: schematically shows an embodiment of an aerodynamic wind energy conversion device according to the invention during flight operation, and FIG. 2: schematically shows the aerodynamic wind energy conversion device according to FIG. 1 with the aerodynamic wing in recovery state.

Figure 2:
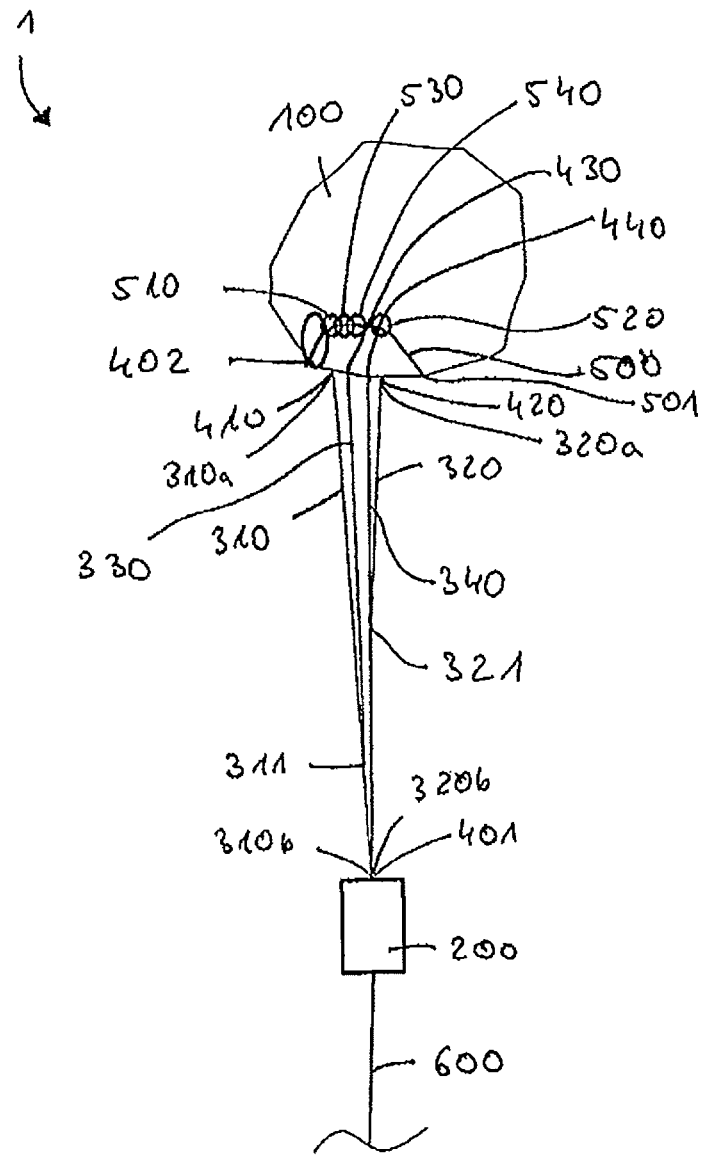

FIGS. 1 and 2 depict an example of an embodiment of the inventive aerodynamic wind energy conversion device 1 comprising an aerodynamic wing 100, a steering unit 200 located below the aerodynamic wing 100 and a tractive cable 600 with its first end being connected to the steering unit 200 and its second end (not shown) being connected to a base platform (not shown), which can for example be located on the deck of a watercraft.

The aerodynamic wing 100 is connected to the steering unit 200 via a first tractive line 310 and a second tractive line 320. The first end 310a of the first tractive line 310 is connected to the aerodynamic wing 100 at a first line connection point 410. The second end 310b of the first tractive line 310 is connected to the steering unit 200 at a base reference point 401. The first end 320a of the second tractive line 320 is connected to the aerodynamic wing 100 at a second line connection point 420. The second end 320b of the second tractive line 320 is connected to the steering unit 200 at the base reference point 401. A first tractive line extension 330 that is connected to the aerodynamic wing 100 at a line extension connection point 430 and to the first tractive line 310 and a first branch point 311. A second tractive line extension 340 extends from a line extension connection point 440 at the aerodynamic wing 100 to a second branch point 321 on the second tractive line 320.

Four reefing points 510, 520, 530 and 540 are located across the aerodynamic wing 100 for guiding a reefing line 500 that is guided through each of the reefing points 510, 520, 530, 540 and connected to the aerodynamic wing 100 at point 501.

The aerodynamic wing 100 comprises a mast adapter 402 that also serves as a top reference point 402. The reefing line 500 is also guided via the mast adapter at top reference point 402.

Each of the line connection points 410, 420, 430, 450 is related to one of the reefing points 510, 520, 530, 540. Between the first line connection point 410 and the first reefing point 510 that is related to the first line connection point 410 there is a first reefing distance. Analogously, there is a second reefing distance between the second line connection point 420 and the second reefing point 520 related to the second line connection point 420. Further, there are third and fourth reefing distances between the third and fourth line connection points 430, 440 of the respectively related third and fourth reefing points 530, 540.

During flight operation of the aerodynamic wing 100 and the aerodynamic wind energy conversion device 1 as depicted in FIG. 1 the four reefing points 510, 520, 530 and 540 each are located in a respective first, second, third and fourth flight reference distance from the top reference point 402. During starting and/or landing maneuvers the preferred shape of the aerodynamic wing with an aerodynamic profile as (only schematically and not drawn to scale) depicted in FIG. 1 has to be changed, particularly reduced, to reduce the uplift force generated by the aerodynamic wing and bring the aerodynamic wing 100 into a recovery state as shown (again only schematically and drawn to scale) in FIG. 2. This is realized by pulling in the reefing line 500, preferably via the top reference point 402. By this pulling action the four reefing points 510, 520, 530, 540 are brought into closer proximity to the top reference point 402 such that first, second, third and fourth recovery reference distances between the four reefing points 510, 520. 530, 540 and the top reference point 402 in a recovery state of the aerodynamic wing 100 as depicted in FIG. 2 are much lower than the flight reference distances.

Due to this inventive arrangement of the reefing points 510, 520, 530, 540 in relation to the line connection point 410, 420, 430, 440 it is possible to reduce the slack of tractive lines 310, 320 and tractive line extensions 330, 340 during recovery of the aerodynamic wing 100 during starting and/or landing maneuvers and therefore increase the safety and/or controllability of the aerodynamic wing 100.

The invention claimed is:

1. An aerodynamic wind energy conversion device (1) comprising:
    an aerodynamic wing (100) with an aerodynamic profile;
    a steering unit (200) located below the aerodynamic wing (100);
    at least a first tractive line (310) and a second tractive line (320); wherein the first end (310b, 320b) of each of the two tractive lines is connected to the steering unit (200), and the second end (310a) of the first tractive line (310) is connected to a first line connection point (410) located at the aerodynamic wing (100), and the second end (320a) of the second tractive line (320) is connected to a second line connection point (420) located at the aerodynamic wing (100);
    a tractive cable (600), a first end (610a) of the tractive cable (600) being connected to the steering unit (200) and a second end (610b) of the tractive cable (600) being connected to a base platform;
    at least a first and a second reefing point (510,520) located across the aerodynamic wing (100) such that the shape of the aerodynamic wing (100) can be controlled via at least one reefing line (500) guided through the first and/or second reefing point (510, 520);
wherein
    the first tractive line (310) has a length extending from the first end (310b) of the first tractive line (310) located at the base reference point (401) to the second end (310a) of the first tractive line (310) at the first line connection point (410) located at the aerodynamic wing (100), and the second tractive line (320) has a length extending from the first end (320b) of the second tractive line (320) located at the base reference point (401) to the second end (320a) of the second tractive line (320) at the second line connection point (420) located at the aerodynamic wing (100);
    wherein the length of the second tractive line (320) is shorter than the length of the first tractive line (310); and
    wherein the first reefing point (510) is related to the first line connection point (410) and spaced from the first line connection point (410) in a first reefing distance and the second reefing point (520) is related to the second line connection point (420) and spaced from the second line connection point (420) in a second reefing distance, such that the second reefing distance is longer than the first reefing distance.

2. The aerodynamic wind energy conversion device (1) according to claim 1, wherein the sum of the length of the first tractive line (310) and the length of the first reefing distance is substantially equal to the sum of the length of the second tractive line (320) and the length of the second reefing distance.

3. The aerodynamic wind energy conversion device (1) according to claim 1, wherein the first reefing point (510) is spaced from a top reference point (402), in a first flight reference distance and the second reefing point (520) is spaced from the top reference point (402) in a second flight reference distance; wherein the at least one reefing line (500) and the reefing points are arranged and adapted such that by pulling the at least one reefing line (500) the first and/or second flight reference distances can be reduced to first and/or second recovery reference distances in order to reduce the shape of the aerodynamic wing (100) such that the aerodynamic wing (100) can be recovered.

4. The aerodynamic wind energy conversion device (1) according to claim 3, wherein the sum of the length of the first tractive line (310), the length of the first reefing distance and the length of the first recovery reference distance is substantially equal to the sum of the length of the second tractive line (320), the length of the second reefing distance and the length of the second recovery reference distance.

5. The aerodynamic wind energy conversion device (1) according to claim 1, further comprising a plurality of tractive lines corresponding to the first and second tractive line (320s) and a plurality of reefing points corresponding to the first and second reefing point (520s), wherein the reefing distances of reefing points related to line connection points of shorter tractive lines are longer than the reefing distances of reefing points related to line connection points of longer tractive lines.

6. The aerodynamic wind energy conversion device (1) according to claim 1, wherein one reefing point is related to two or more line connection points such that the respective two or more line connection points are spaced from said one reefing point in two or more reefing distances.

7. The aerodynamic wind energy conversion device (1) according to claim 1, further comprising a mast adapter located on the aerodynamic wing (100), wherein the mast adapter is configured to serve as at least one mast adapter reefing point, wherein the flight reference distance and the recovery reference distance of the mast adapter reefing point are substantially equal.

8. The aerodynamic wind energy conversion device (1) according to claim 1, further comprising a first tractive line (310) extension having a length extending from a branch point between the first and the second end (320b) of the first tractive line (310) to an extension line connection point located at the aerodynamic wing (100).

9. The aerodynamic wind energy conversion device (1) according to claim 8, wherein the sum of the first tractive line (310) extension and a partial length of the first tractive line (310) between the first end (310b) of the reference line or the base reference point (401) and the branch point is substantially equal to the sum of the length of the first tractive line (310) and the length of the first reefing distance.

10. The aerodynamic wind energy conversion device (1) according to claim 9, wherein the sum of the first tractive line (310) extension, a partial length of the first tractive line (310) between the first end (310b) of the first tractive line (310) or the base reference point (401) and the branch point, and a recovery reference distance between the extension line connection point and a reefing point related to the extension line connection point is substantially equal to the sum of the length of the first tractive line (310), the length of the first reefing distance and the length of the first recovery reference distance.

11. The aerodynamic wind energy conversion device (1) according to claim 10, further comprising a plurality of tractive line extensions corresponding to the first tractive line (310) extension and a plurality of reefing points related to respective extension line connection points, wherein the reefing distances of reefing points are shorter when related to extension line connection points with a larger sum of the length of the respective tractive line extension and the partial length of the respective tractive line between the first end (310*b*) of the respective tractive line or the base reference point (401) and the branch point.

12. The aerodynamic wind energy conversion device (1) according to claim 1, further comprising a further reefing point related to at least one line connection point, wherein the further reefing point is located at one of the tractive lines or tractive line extensions.

13. A watercraft comprising an aerodynamic wind energy conversion device (1) according to claim 1.

14. Use of an aerodynamic wind energy conversion device (1) according to claim 1 to drive a watercraft.

15. A method for controlling an aerodynamic wind energy conversion device (1 for watercraft, comprising the steps:
  providing an aerodynamic wind energy conversion device (1), comprising:
  an aerodynamic wing (100) with an aerodynamic profile;
  a steering unit (200) located below the aerodynamic wing (100);
  at least a first tractive line (310) and a second tractive line (320); wherein the first end (310*b*) of each of the two tractive lines is connected to the steering unit (200), and the second end (320*b*) of the first tractive line (310) is connected to a first line connection point (410) located at the aerodynamic wing (100), and the second end (320*b*) of the second tractive line (320) is connected to a second line connection point (420) located at the aerodynamic wing (100);
  a tractive cable (600), a first end (310*b*) of the tractive cable (600) being connected to the steering unit (200) and a second end (320*b*) of the tractive cable (600) being connected to a base platform; and
  at least a first and a second reefing point (520) located across the aerodynamic wing (100) such that the shape of the aerodynamic wing (100) can be controlled via at least one reefing line (500) guided through the first and/or second reefing point (520);
  reefing the aerodynamic wing (100) by pulling the at least one reefing line (500) such that that the second reefing distance is longer than the first reefing distance;
  and
  providing an aerodynamic wind energy conversion device (1) according to claim 1.

16. The aerodynamic wind energy conversion device (1) according to claim 2, wherein, the sum of the length of the first tractive line (310) and the length of the first reefing distance differs less than 30 percent to the sum of the length of the second tractive line (320) and the length of the second reefing distance.

17. The aerodynamic wind energy conversion device (1) according to claim 16, wherein, the sum of the length of the first tractive line (310) and the length of the first reefing distance differs less than 20 percent to the sum of the length of the second tractive line (320) and the length of the second reefing distance.

18. The aerodynamic wind energy conversion device (1) according to claim 7, wherein, the sum of the length of the first tractive line (310) and the length of the first reefing distance differs less than 10 percent to the sum of the length of the second tractive line (320) and the length of the second reefing distance.

19. The aerodynamic wind energy conversion device (1) according to claim 1, further wherein a mast adapter is located on the aerodynamic wing (100).

20. The aerodynamic wind energy conversion device (1) according to claim 5, wherein the respective sums of the length of a tractive line and the respective reefing distance differ from each other by less than 30 percent.

21. The aerodynamic wind energy conversion device (1) according to claim 9, wherein the sum of the first tractive line (310) extension, a partial length of the first tractive line (310) between the first end (310*b*) of the first tractive line (310) or the base reference point (401) and the branch point, and a recovery reference distance between the extension line connection point and a reefing point related to the extension line connection point differ by less than 30 percent to the sum of the length of the first tractive line (310), the length of the first reefing distance and the length of the first recovery reference distance.

* * * * *